United States Patent
Koponen

(10) Patent No.: US 11,525,068 B2
(45) Date of Patent: Dec. 13, 2022

(54) METHOD OF PRODUCING AN ELASTIC COATING AND AN ELASTIC COATING

(71) Applicant: Build Care Oy, Vantaa (FI)

(72) Inventor: Vesa Koponen, Vantaa (FI)

(73) Assignee: Build Care Oy, Vantaa (FI)

( * ) Notice: Subject to any disclaimer, the term of this patent is extended or adjusted under 35 U.S.C. 154(b) by 378 days.

(21) Appl. No.: 16/754,780

(22) PCT Filed: Oct. 11, 2018

(86) PCT No.: PCT/FI2018/050734
§ 371 (c)(1),
(2) Date: Apr. 9, 2020

(87) PCT Pub. No.: WO2019/073121
PCT Pub. Date: Apr. 18, 2019

(65) Prior Publication Data
US 2021/0198515 A1 Jul. 1, 2021

(30) Foreign Application Priority Data

Oct. 11, 2017 (FI) .................................... 20175894

(51) Int. Cl.
| | |
|---|---|
| *C09D 133/08* | (2006.01) |
| *C09D 7/61* | (2018.01) |
| *C09D 5/02* | (2006.01) |
| *C08K 3/22* | (2006.01) |
| *C08K 3/36* | (2006.01) |

(52) U.S. Cl.
CPC .......... *C09D 133/08* (2013.01); *C09D 5/024* (2013.01); *C09D 7/61* (2018.01); *C08K 3/22* (2013.01); *C08K 3/36* (2013.01); *C08K 2003/2227* (2013.01); *C08K 2003/2265* (2013.01)

(58) Field of Classification Search
CPC ........ C09D 5/024; C09D 7/61; C09D 133/08; C08K 3/22; C08K 3/36; C08K 2003/2227; C08K 2003/2265
See application file for complete search history.

(56) References Cited

U.S. PATENT DOCUMENTS

| | | | |
|---|---|---|---|
| 4,714,507 A | 12/1987 | Ohgushi | |
| 4,975,484 A * | 12/1990 | Fryd ...................... | C09J 133/20 526/273 |
| 7,235,294 B2 * | 6/2007 | Story ..................... | C09J 133/08 428/522 |
| 2012/0094115 A1* | 4/2012 | Takeda .................... | C09D 7/70 524/451 |
| 2013/0037989 A1 | 2/2013 | Wiercinski et al. | |
| 2013/0131228 A1 | 5/2013 | Hashimoto et al. | |

FOREIGN PATENT DOCUMENTS

| | | |
|---|---|---|
| CA | 2205668 A1 | 11/1997 |
| CN | 102965018 A | 3/2013 |
| CN | 103525307 A | 1/2014 |
| CN | 103555203 A | 2/2014 |
| CN | 103865392 A | 6/2014 |
| CN | 103834249 B | 6/2016 |
| CN | 107083190 A | 8/2017 |
| DE | 2027606 A1 | 12/1971 |
| EP | 0794018 A2 | 9/1997 |
| EP | 1555268 A1 | 6/2005 |
| WO | WO2005080519 A1 | 9/2005 |
| WO | WO2011004753 A1 | 1/2011 |
| WO | WO2014097309 A1 | 6/2014 |
| WO | WO2019073122 A1 | 4/2019 |

\* cited by examiner

*Primary Examiner* — James C Goloboy
(74) *Attorney, Agent, or Firm* — Laine IP Oy

(57) ABSTRACT

The present invention relates to a method of producing an elastic coating which is suitable for waterproofing, by using film forming onto a solid surface, textile or mesh. In this method, a dispersion which comprises i) one or more adhesives and/or coagulating aggregates, mainly in solid form, ii) one or more polymers, and iii) one or more surface-active agents, is brought into contact with a coagulator of the surface-active agent of the dispersion. The present invention also relates to a coating which is prepared by using the present method.

18 Claims, No Drawings

METHOD OF PRODUCING AN ELASTIC COATING AND AN ELASTIC COATING

FIELD OF THE INVENTION

The present invention relates to elastic coatings, to compositions for the manufacturing of them and to the use thereof. In particular, the present invention relates to a method of producing a coating which is suitable for waterproofing, according to the preamble of Claim 1. The present invention also relates to an elastic coating, according to the preamble of claim 17.

DESCRIPTION OF RELATED ART

Numerous coatings and coating methods are known, many of which are suitable for waterproofing. In generally known methods, the surface to be waterproofed should be dry, because moisture either prevents the coating from hardening or significantly reduces its adhesion. This makes it difficult, slows down, or even makes it impossible to achieve waterproofing at outdoor locations.

A majority of the methods also involve the use of solvents and other substances which are considered harmful. The use of solvents is increasingly considered to be an industrial safety and environmental problem, which is why their use is limited and therefore preferably avoided.

In this respect, CA 2205668, US 2013131228, CN 103525307, CN 102965018, CN 103555203 and DE 2027606, represent the prior art.

Also, some water-based coatings are already known. These are described, for example, in the application publications EP 0 794 018 A2 and EP 1 544 268 A1.

However, the weatherproof properties of these water-based coatings have proved to be inadequate: characteristic features have been, among others, detachment, peeling off and cracking of the coatings.

SUMMARY OF THE INVENTION

It is an aim purpose of the present invention to reduce or even completely eliminate the abovementioned problems encountered in the art.

In particular, the purpose of the present invention is to generate a method for manufacturing of novel elastic coatings.

Another purpose of the present invention is to generate novel coatings.

The present invention is based on the discovery that by adding solids to a polymer dispersion, which comprises a water-dispersed polymer which, in turn, is in the form of polymer particles, it is possible to generate a polymer composition in which the dispersed polymer particles remain at a distance from each other, which distance is suitable for the controlled formation of a film.

A distance which is suitable for the film formation is achieved particularly by adding solids, the average particle size of which is bigger than the polymer particle size, and which is at least partly capable of absorbing these polymer particles. This prevents uncontrolled caking of the dispersion, which is otherwise caused by the polymer particles getting too close to each other. On the other hand, particles which are too far from each other cannot form a uniform film, which is necessary to generate a uniform coating.

By bringing the components of the polymer composition adequately close to each other, secondary bonds are formed between them, in which case the dispersion forms a film.

A polymer film can be generated from the dispersion according to the present invention by shortening the distances between the polymer particles, for example by removing moisture, i.e. water, between the particles. The liquid phase may be removed either actively (by raising the temperature or otherwise drying) or typically passively, i.e. by allowing the liquid to evaporate or by allowing it to be absorbed by the structures, or by a combination thereof. A solid and potentially solidifying aggregate forms a three-dimensional structure in the waterproofing film, which structure acts as a physical support structure and onto the surface of which the polymer particles adhere.

In this way, it is possible to form an elastic coating suitable for waterproofing on a solid surface, textile or mesh.

More specifically, the method according to the present invention is characterized by what is stated in the characterizing part of claim 1.

The elastic coating according to the present invention is in turn characterized by what is stated in the characterizing part of claim 17.

Considerable advantages can be achieved with the present invention. Thus, the method according to the present invention ensures the waterproofing adheres well to all surfaces, even in cases where the surface is wet before coating.

The dispersion used in the method according to the present invention comprises a liquid phase into which other components of the dispersion, such as polymer particles, are dispersed.

According to one preferred embodiment of the present invention, no organic solvents are used in the method. In this embodiment, the dispersion used in the method is free from organic solvents and is more preferably based on water. Using water as a liquid phase of the dispersion, along with the non-toxicity and operational safety of the other substances comprised in the recipe, makes it possible to generate an ecological and non-toxic coating.

The non-toxicity and environmental friendliness of the product according to the present invention are also supported by the fact that problematic compounds, such as isocyanates, fluorinated compounds or styrene that are commonly found in various coatings, are not used when manufacturing the product.

Therefore, the use of this method is safe and pleasant, because it is not necessary for the coater to be protected against the dangers of organic solvents, such as by using a gas mask. Coated surfaces can also be used immediately after the coating is dried, without ventilation, and there are no health and explosion hazards caused by the evaporation of the solvent, even when small enclosed spaces are being coated. The use of a solvent-free dispersion is therefore very safe.

The coating generated is based on a reinforced cross-linked structure formed by the dispersion, which structure is based on the chemical interactions between the dispersion components.

The polymer layer that is generated is already waterproof when it is a thin film but, if necessary, its thickness may be several centimetres.

If desired, the gas impermeability of the film can also be improved by adding to the dispersion an initially soluble absorbent material, which is solidified during the film-forming stage.

Although the polymer film has good waterproof and gasproof properties, it has a good breathability and water vapour permeability.

In the following, preferred embodiments of the present invention will be described in more detail.

EMBODIMENTS

In one embodiment, the elastic coating suitable for waterproofing can be produced by using the formation of a film on a solid, mesh-like or porous surface The dispersion according to the present invention generally comprises
i) one or more solid matters in at least mainly solid form, in the following also referred to as aggregate,
ii) one or more polymers, and
iii) one or more surface-active agents, and
iv) one or more coagulators.

In addition, the dispersion also comprises a medium, i.e. a liquid into which the components described are dispersed.

In one embodiment, a present water-based polyacrylate used in the dispersion comprises
a. a polymer dispersion having particles of different sizes or having a wide multimodal particle size distribution,
b. a dispersed metal compound such as metal salt, metal oxide or metal sulphate, or metal ions, and
c. Components that facilitate crosslinking of polymers, such as aluminium oxide, silicon dioxide, or combinations thereof.

In addition to these components a-c, the dispersion typically includes a dispersing agent such as a surface-active agent.

By homogenising the mixture, a homogenised, stable polymer dispersion is achieved.

A polymer layer, such as a coating or film, is achieved from the polymer dispersion. The polymer dispersion is applied onto a substrate, such as a solid, mesh-like or porous substrate, and a film is formed of the dispersion by removing the liquid phase from the dispersion.

In particular, the dispersions described are capable of forming a reinforced film based on a molecular cross-linked structure, using chemical interaction of crosslinking components mentioned at embodiments i, ii and iv and a to c, respectively.

Most suitably, no earlier than during the coating, the surface-active agent of the dispersion is brought into contact with the coagulator. Most suitably, in this case there is a hydrophobic part in the coagulator. Thus, from the dispersion it is possible to cross-link a polymer film on a substrate, during the coating process.

In one preferred embodiment, the hydrophobic part of the coagulator prevents the dispersion from generating the polymer crosslinking, until the dispersion is brought to such a pressure that the hydrophobic component can no longer prevent precipitation.

In another preferred embodiment, which can also be combined with the previous, the use of a hydrophobic component makes it possible to prevent the dispersion from generating the polymer crosslinking, until a sufficiently large percentage is removed from the liquid phase, preferably the water, that the hydrophobic component of the coagulator is no longer able to prevent crosslinking. The liquid phase can be removed, for example, by evaporation or by absorption of the liquid phase into materials that surround the surface to be coated, such as the surface materials which delineate the surface.

Accordingly, one aspect is that the polymer film can be formed from the dispersion onto the substrate no earlier than during the coating, when the particle distances of the dispersion become favourable to film formation. This is most suitably carried out by removing liquid from the dispersion.

"Polymer dispersion" or "dispersion", respectively, refers in the present context to a composition wherein the polymer or polymers are present as dispersed in the medium. The polymer dispersions also comprise other dispersed, finely divided components. Most suitably, the particle sizes of all dispersed components are less than 10 micrometres, especially less than 5 micrometres. In this context, the term "dispersion" also includes other compositions in which liquid or solid components are dispersed in the continuous phase.

In one preferred embodiment, the dispersion provides a polymer cross-linked structure which is a viscoelastic elastomer, which can be demonstrated, for example, by a time-rupture test. When the composition forms an elastic film, the cross-linked structure is formed by chemical bonds between the substances, preferably through weak chemical interactions, such as ionic bonds, coordination bonds, dipole-dipole interactions or Van der Waals bonds.

The composition may be an ionomer by nature.

The present dispersion comprises one or more polymers. Especially, the dispersion comprises the polymer or polymers in dispersed form.

In one embodiment, the dispersion comprises at least two different polymers.

In one embodiment, the dispersion includes a copolymer, which consists of at least two different types of acrylate monomer.

The liquid phase of the dispersion, i.e. "dispersion medium" is preferably comprised of water. More preferably, the dispersion is essentially free from volatile organic solvents. Thus, the percentage of water is at least 95%, most suitably at least 97%, of the liquid volume of the entire dispersion medium.

In one embodiment, a dispersion, which comprises two or more homo- or copolymers with different particle sizes, is obtained by mixing with each other two or more different and distinct polymer dispersions.

The polymer dispersions to be mixed may differ from each other in order that they comprise different polymers, their monomer composition differs from one another, or in order that their particle size distributions differ from each other. The particle size distribution of the generated dispersion may be, for example, a multimodal distribution, such as a bimodal distribution, and may comprise one or more, especially two or more polymers.

In the present context, the term "multimodal" particle size distribution includes both the case where one and the same polymer has a particle size distribution with several peaks, and the case where two polymers have particle size distributions, the peaks of which differ from each other. A broad, one-peak distribution is also included in this concept.

In one embodiment, the polymer dispersion particle size has a polydispersity index of more than 1.5, especially more than 2.

The polymer used in the dispersion most suitably comprises reactive groups, such as carboxylic acid groups or generally acrylic acid functionality or vinyl groups, such as vinyl esters, which allows the generated coating to adhere to different substrate surfaces. When an appropriate polymer or polymers are chosen, it is possible to affect the properties of the coating and tailor the coating to suit different applications. Thus, the choice of polymers affects, for example, the interaction between the polymers in the dispersion, the formation of the cross-linked structure, and the formation of bonds with other added elements, when the coating is dried or hardened or when the film formation occurs.

The choice of polymer also determines other desired properties of the generated coating, such as weatherproofness, water impermeability, chemical resistance, and elasticity. Typically, the coating or film generated from the composition according to the present invention is highly weatherproof and chemically resistant and inert.

According to one embodiment, a polymer which can be dispersed in the aqueous phase is used. In another embodiment, at least one of the dispersion polymers is an acrylate polymer. Most suitably, the dispersion comprises at least two polymers of different average particle size, which are acrylate polymers.

In this context "acrylate polymer" refers to polymers and copolymers prepared from acrylic acid or its esters. Thus, here "acrylate polymers" also include acrylate copolymers. Acrylate polymers have a low glass transition temperature, typically at maximum+6° C., especially approximately −36° C. to ±0° C., and they have good adhesion properties.

In one embodiment, the acrylate polymer or acrylate copolymer comprises one or, correspondingly, more of the units according to Formula I

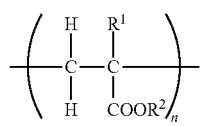

where
$R^1$ and $R^2$
independently of each other, represent hydrogen, lower, straight or branched alkyl, aryl and alkaryl, which is optionally substituted, and
n is an integer from 10 to 10,000, typically approximately 100 to 2500.

The acid monomer of the acrylate polymer is typically acrylic acid or methacrylic acid, and, in addition, the comonomers used can be butyl acrylate, 2-ethylhexyl acrylate, methyl methacrylate and styrene, or mixtures thereof. In addition, itaconic acid, maleic acid, fumaric acid, and mixtures thereof may be used.

By means of the alternating substituents of Formula I, it is possible to affect the formation of the polymer dispersion, the hydrophilicity or, correspondingly, the hydrophobicity, glass transition temperature of the polymer, and chemical interactions, when other components, such as metal compounds, are added.

Examples of the aryl derivative include phenyl and alkaryl styrene.

Examples of suitable acrylate polymers include polymethyl acrylate and styrene-acrylic copolymer and mixtures thereof.

The polymer may also be polyvinylpyrrolidone, polyvinyl acetate or polyvinyl alcohol, most suitably mixed with an acrylate polymer. The mass ratio of the acrylic polymer and one or more other polymers is most suitably 10:90-99:1, especially 20:80-95:5. Different copolymers are also possible.

The dispersion polymer acts as the elastic matrix of the generated coating or film, which matrix is generated when crosslinking the polymer. This is achieved when the liquid phase between the particles evaporates or water is otherwise removed from the dispersion (for example, the water may be absorbed into the substrate). In this case, the polymer component of the dispersion forms, through the film-forming event, a layer, most suitably a uniform layer.

The polymers included in the dispersion may differ from each other, with regard to the particle size of the dispersed polymer particles. In a more preferred embodiment, two or more polymers are used in the dispersion, at least one polymer of which has a substantially larger particle size than the other or the others.

In one embodiment, the first polymer, which has a particle size larger than the particle size of the other polymer, preferably acts as a matrix of the polymer layer, such as a coating or film, and reinforces the strength properties of the coating. The other polymer, having a particle size smaller than the particle size of the first polymer, will in turn densify the structure of the polymer layer by filling the empty spaces between the larger particles. It also forms the film faster than the polymer having a larger particle size. The particle size distribution of the polymer can thus also affect the formation rate of the coating.

Because different polymers have different adhesion properties, the choice of polymer may affect the range of application of the product generated by the method. The choice of polymers makes it also possible to adjust the hydrophilicity and hydrophobicity of the product for various applications.

Typically, the ratio between the average particle size of the particles of the first polymer and, correspondingly, the other polymer or of the other polymers included in the dispersion, is at least 1.25:1, especially at least 1.5:1, and most suitably approximately 2:1-100:1, typically approximately 2.5:1-10:1.

In one embodiment, the first, larger-sized polymer has an average particle size of approximately 0.25-1 μm, and the other, smaller-sized polymer has an average particle size of approximately 0.01-0.2 μm.

In one embodiment, the first polymer comprises an acrylate polymer, especially an acrylate copolymer having a polymer particle size of approximately 500±50 nm, and the other polymer comprises an acrylate polymer, especially an acrylate copolymer having a polymer particle size of approximately 100±10 nm.

The weight ratios in the mixture between the mole fractions of the first and, correspondingly, the other polymer or other polymers may be for example 1:100-100:1, most suitably approximately 1:20-20:1, for example 1:5-5:1.

"Particle size of polymer" means an average particle size that can be determined, for example, by light or electron microscope, based on light-scattering, such as based on multiangle laser light-scattering (MALLS), or by using a device which functions according to the Coulter principle.

In one embodiment, the dispersion comprises a mixture which is formed by mixing with each other two polymer dispersions, the polymers of which have different average particle sizes.

In one embodiment, the polymer or polymers are acrylate polymers, which can be used or which are used as dispersions, the dry matter content of which is at least 30% by weight or at least 35% by weight. Typically, the acrylate polymer dispersions used have a dry matter content of at maximum approximately 85% by weight.

In one embodiment, the first polymer can be used or is used as a dispersion, the dry matter content of which is approximately 50-70% by weight, for example approximately 55-65% by weight.

In one embodiment, the other polymer can be used or is used as a dispersion, the dry matter content of which is approximately 30-50% by weight, for example approximately 35-45% by weight.

In one embodiment, alkaline polymer dispersions are used. Such polymer dispersions are typically anionically stabilised. In this embodiment, the pH value of the polymer dispersions is higher than for example approximately 7, especially higher than approximately 8, most suitably higher than approximately 9. However, the value of the polymer dispersions is typically lower than approximately 14.

In one embodiment, acidic polymer dispersions are used. Such polymer dispersions are typically cationically stabilised. In this embodiment, the pH value of the polymer dispersions is for example lower than approximately 7, especially lower than approximately 6.5, most suitably lower than approximately 6. However, the pH value of the polymer dispersions typically higher than approximately 1.

In one embodiment, where two or more initial material-polymer dispersions that are mixed with each other are used to prepare the polymer dispersion, both or all of the initial material-polymer dispersions are either anionically or cationically stabilised.

The surface-active agent, i.e. the dispersant, is capable of keeping the polymer dispersed in the liquid phase during the preparation and storage of the composition.

Such a dispersant is typically a monomeric or polymeric surface-active agent. Polymer dispersions are generally anionically stabilised but they may also be cationically stabilised.

Examples of surface-active agents include sodium lauryl sulphate and alkyl benzene sulphonic acid or sulphonate, such as sodium dodecyl diphenyloxide disulphonate.

The amount of the surface-active agent is generally approximately 0.01-5% of the amount of polymer.

In one embodiment, the surface-active agent is not separately added to the polymer dispersion, but one or more polymer dispersions are used as the initial material for the dispersion preparation, in which case the polymer or polymers are dispersed using an emulsifier, i.e. a surface-active agent into a medium such as water. In this case, this medium also forms the dispersion medium of the dispersion to be prepared.

In the present context, "aggregate" means a substance which is added in a solid and preferably finely divided form, for example as powder, granules or particles, into a polymer solution. The aggregate may be partly or completely soluble in the liquid phase, i.e. the aqueous phase, but most of the aggregate may also be in solid form in the dispersion.

The aggregate is generally an inorganic substance, most suitably an oxide compound or a sulphate compound, such as a metal or semi-metal oxide or sulphate, or a mixture thereof. The metals include aluminium, gallium and tin, and transition metals such as iron, copper, zinc, chromium, vanadium, nickel, titanium and zirconium. The semi-metals include silicon, germanium and antimony.

It is also possible to use corresponding hydroxide compounds which are either insoluble or poorly soluble in water.

According to one embodiment, at least part of the aggregate particles has an average size of 0.01-0.2 µm, especially approximately 0.02-0.15 µm. Most suitably, at least 1% by weight, especially approximately 2.5-50% by weight of the aggregate, consists of such particles.

According to one embodiment, at least some of the aggregate particles are those having an average size of 0.2-7.5 µm, especially approximately 0.5-5 µm, for example 1-3 µm. Most suitably, at least 1% by weight, especially approximately 2.5-50% by weight of the aggregate, consists of such particles.

According to one embodiment, the aggregate comprises a percentage of particles, the average particle size of which is 0.025-1 µm, especially approximately 0.1-0.75 µm. The percentage of such particles of the aggregate is generally at least 50% by weight, especially approximately 60-99% by weight.

In one embodiment, the amount of aggregate which is incorporated in the composition is approximately 1-25% by weight, especially approximately 5-20% by weight, for example approximately 7.5-16% by weight, calculated from the dry matter.

Choosing the particle size can affect the gas permeability, i.e. breathability of the polymer layer which is formed of the dispersion. A larger number of pores that are generated between larger particles when the material is drying makes the layer more breathable.

The aggregate may partially dissolve into the liquid phase of the dispersion, but during the crosslinking the aggregate typically returns to a solid, insoluble state. The state of the aggregate can be affected, for example, by changing the pH value or pressure during this process.

According to the present invention, the dispersion may comprise one or more aggregates. According to a preferred embodiment of the present invention, the aggregate contained in the dispersion comprises one or more iron or aluminium compounds or combinations thereof.

According to a more preferred embodiment, the aggregate comprises a mixture of iron and aluminium compound. Preferably, both the iron and aluminium compounds are oxides or the iron compound is iron oxide and the aluminium compound is aluminium hydroxide.

According to one embodiment, the average particle size of the iron compound particles comprised in the aggregate is in the range 0.025-1 µm, preferably in the range 0.1-0.5 µm, more preferably in the range 0.15-0.3 µm, for example 0.2 µm.

Preferably, the percentage of iron compound particles in the aggregate is 50-99% by weight, more preferably 75-98% by weight.

According to one embodiment, the average particle size of the aluminium compound particles comprised in the aggregate is in the range 0.01-0.2 µm, preferably in the range 0.02-0.1 µm, for example 0.06 µm.

According to another embodiment, the average particle size of the aluminium compound particles comprised in the aggregate is in the range 0.2-7.5 µm, preferably in the range 0.5-5 µm, for example 1-3 µm.

Preferably, the percentage of aluminium compound particles in the aggregate is 1-50% by weight, more preferably 2-25% by weight.

According to one embodiment, the weight ratio of particulate aluminium and iron compounds in the aggregate is in the range 1:99-1:1, for example 1:50-1:2, preferably in the range 1:9-1:3.

The iron compound may be, for example, ferrous, ferric or iron (II, III) oxide. These, in particular the last mentioned, provide adhesion properties to the polymer to be cross-linked from the dispersion.

The aluminium compound may be, for example, aluminium oxide or aluminium hydroxide, such as precipitated aluminium hydroxide.

In one embodiment, the purpose of the aggregate is, after the addition of the coagulator and in water-insoluble form, either as such or after dissolving and subsequent re-precipitation, to act as an internal adhesive surface between the polymers that have been coagulated to an insoluble form, thereby increasing the strength and toughness of the finished product.

In one embodiment, the solid aggregate particles comprised in the dispersion act as precipitation nuclei of the dispersion, to which nuclei the polymer particles adhere when the surface-active agent ceases to have an effect, and/or the liquid phase between the particles evaporates.

In one embodiment, the solid aggregate acts in the structure as an internal adhesion surface by filling the "volumes" between the polymer particles, thereby acting in the finished coating to inhibit any cracking resulting from shrinkage, because it forms a three-dimensional internal support structure which reduces changes in the volume of the finished coating. In this way, the aggregate is able to act as an inhibitor of cracking resulting from shrinkage. At the same time, in the present embodiment, the aggregate acts as a densifier and strength enhancer of the product.

In one embodiment, it has been found that by increasing the density of the film formed by the dispersion, the decomposition of the concrete surfaces to be coated can be slowed down. In particular, coating renders it possible to slow down the carbonation of the concrete. It is also possible to prevent or at least slow down such loss of strength of concrete, which is caused by an increase in the porosity of the concrete, which is caused by, for example, the washing away of the water-soluble components of the concrete.

In one embodiment, an aggregate is used which at least partly dissolves in the liquid phase of the dispersion. In this case, the dissolved part of the aggregate can act as an accelerator in the crosslinking reaction of the polymer particles, and as an adstringement of the polymer particles. This is relevant for the interaction between the polymer particles and the aggregate particles.

The aggregate generally improves the product properties of the coating or film formed of the dispersion, for example by slowing down the corrosion of the structures and surfaces to be protected by the coating or film, and the decomposition of concrete surfaces.

In one embodiment, the reaction between the dissolved part of the aggregate and the surface-active agent can also prevent the re-dissolution of the surface-active agent or the surface-active agents of the dispersion, once crosslinking has taken place.

In one embodiment, the aggregate comprises iron or aluminium compounds or mixtures thereof; typically, the dissolved part of the aggregate comprises positively charged iron or aluminium ions or mixtures thereof. Especially the dissolved part comprises $Fe^{2+}$, $Fe^{3+}$ or $Al^{3+}$ ions or mixtures thereof.

In one embodiment, iron oxide ($Fe_3O_4$) is used as the aggregate. This slows down, for example, the corrosion of a steel surface to be protected by a coating or film to be formed of a dispersion.

In one embodiment, the dissolved part of the aggregate may form secondary bonds with points having opposite charges of the dipoles of the polymer particles, by using electrostatic forces.

By choosing the aggregate or the aggregates, it is possible to appropriately affect the properties of the dispersion, its crosslinking speed, and the properties of the generated coating.

To promote the formation of a film, a coagulator is used, i.e. a "precipitant", which provides a structure which is cross-linked in a controlled way. According to one embodiment of the present invention, a film is formed of the dispersion by removing moisture, i.e. by allowing the dispersion, which is spread to form a layer, to dry.

The coagulator and the surface-active agent interact in such a manner that the evaporation of the liquid phase of the dispersion, while the coating dries, leads to a situation in which the surface-active agent is no longer capable of holding the polymer particles of the dispersion apart, based on electrical repulsion forces, and the polymer particles are cross-linked and form a solid structure in which the polymer matrix includes aggregate particles and coagulator particles.

According to one embodiment of the present invention, solidification of the dispersion and crosslinking of the polymer are prevented by using the hydrophobic component comprised in the coagulator, until the liquid phase of the dispersion, preferably water, has evaporated or, correspondingly, absorbed into the surface materials which limit the solid surface to be coated, to such an extent that the hydrophobic component can no longer prevent crosslinking.

In one embodiment of the present invention, the formation of a cross-linked structure from the dispersion is prevented by the hydrophobic component of the coagulator, until the dispersion is brought to such a pressure that the hydrophobic component can no longer prevent crosslinking. This can be achieved, for example, by spraying the dispersion with high pressure spraying.

When spraying with higher pressure, the drop size of the spray decreases and the air contact increases, which promotes the removal of water.

In the method according to the present invention, one coagulator or a mixture of several coagulators may be used in the dispersion. In particular, a solid, finely divided coagulator or a mixture of two or more solid, finely divided coagulators is used.

According to one embodiment, the coagulator is a material which comprises silicon dioxide such as fumed silica. Silicon dioxide can be used in hydrophilic form, hydrophobic form and as a mixture thereof.

According to one embodiment, a coagulator such as silicon dioxide is in hydrophobic form (hereinafter also referred to as "hydrophobic part"). In such a form the hydroxyl groups of the silicon dioxide surface are replaced by hydrocarbon groups. An example of a hydrophobic component is fumed silica, which is treated with dimethyl dichlorosilane.

The hydrophobic part is, for example, in colloidal form.

The hydrophobic part can be used to reduce or completely prevent the crosslinking of the dispersion polymer and to improve the adhesion between the aggregate particles and the dispersion polymer particles during and after the crosslinking event.

The hydrophobic part can also be used to adjust the rate of crosslinking, because the hydrophobic part of the coagulator may be used to keep separate the components involved in the crosslinking reaction, until the required amount of dispersion liquid phase has evaporated or the pressure of the dispersion has changed, thereby triggering the crosslinking process.

Hydrophobic silicon dioxide contributes to the aggregate remaining dispersed.

Hydrophilic silicon dioxide can also be fumed silica. Hydrophilic silicon dioxide comprises hydroxyl groups on its surface and it is typically water-absorbing. Hydrophilic silicon dioxide also affects the pH value of the composition.

The weight ratio of the hydrophobic and, correspondingly, the hydrophilic silicon dioxide is generally 25:1-1:25, especially approximately 10:1-1:10, for example approximately 1:8.

The total amount of the hydrophilic and the hydrophobic silicon dioxide, as the precipitating agent, is approximately 1-6% by weight of the dry matter.

The coagulator such as silicon dioxide is typically finely divided. In one embodiment, at least one coagulator has an average particle size of approximately 5-100 nm, most suitably 10-25 nm.

The amount of coagulator is typically approximately 0.01-10% by weight, for example 0.1-7.5% by weight, usually 1-5% by weight, of the dry matter.

The coagulator makes the generated coating or film reduce dripping, by using thixotropic crosslinking. This property allows the method according to the present invention to be used also to coat vertical or downwardly oriented surfaces, such as the inner surfaces of roofs. In addition, the coagulator typically increases the wet strength of the generated coating or film.

The hydrophobicity of the coagulator also makes it possible to adjust the drying rate of the generated coating or film. The more hydrophobic components the coagulator comprises, the faster the coating and the membrane will dry. The hydrophobicity of the coagulator also makes it possible to control the pore size of the coating and film. The pore size of the coating and film determines the "breathability" of the coating, i.e. the substance which comprises hydrophobic component prevents moisture penetrating into the coating or film and, in turn, into the material to be coated, while at the same time it tends to remove possible moisture from the material to be coated, onto the surface of the coating or film, by repelling moisture.

In one embodiment, the hydrophobic component prevents solidification of the dispersion, until the dispersion is brought to such a pressure that the hydrophobic component can no longer prevent the crosslinking of the polymer.

Coagulation of the dispersion is prevented by, for example, the hydrophobic component comprised in the dispersion, until the liquid phase of the dispersion, preferably water, has evaporated and/or been absorbed into the surface materials which delineate the solid surface to be coated to such an extent that the hydrophobic component can no longer prevent crosslinking.

Controlled coagulation and non-dripping property of the coating can also be carried out with various acids, such as oxalic acid, acetic acid or citric acid, and various other thixotropic agents. Their amounts are approximately 0.1-10% by weight of the dry matter. These materials can be used instead of or in combination with silicon dioxide.

The dispersion used in the method according to the present invention may also comprise various additives. Useful additives are, among others, various microspheres which are used a filler and/or rigidity regulator, as well as alumina cement and sand as providers of additional strength.

Preparation of the Composition

The compositions described above are prepared by adding, while stirring, the aggregate to a polymer dispersion, in which the polymer is dispersed in a suitable medium, such as water. The addition can be made at room temperature.

The polymer dispersion may be a dispersion formed of one polymer or it may be formed by mixing two or more polymer dispersions with each other, the average particle size of which polymers are different.

Most suitably, the emulsifier is not added separately, but the initial material is a polymer dispersion, in which the polymer is dispersed by means of an emulsifier. However, it is possible to add more emulsifiers to the dispersion.

After the addition of the aggregate, a coagulator or coagulators are also added, while briskly stirring, to the dispersion thus generated.

If necessary, the dry matter content of the composition may, after stirring, be adjusted to the required level of the application.

While adding the aggregate and the precipitant, the pH value of the composition is kept above or, correspondingly, below the limit value of the pH, at which the polymer-aggregate starts to precipitate from the dispersion. The pH value is determined by the polymer emulsification; the polymer dispersions used in the method are either anionically or cationically stabilised, as described above.

According to one embodiment, the pH value of the dispersion is maintained, while adding the metal oxide particles and the precipitant, at a value which is above 7, at which point polymers are anionically stabilised.

According to one embodiment, the pH value of the dispersion is maintained, while adding the metal oxide particles and the precipitant, at a value which is below 6.5, at which point the polymers are anionically stabilised.

In one embodiment, the present polymer dispersion comprises, per 100 parts by weight of dispersed material (i.e., 100 parts by weight of the dry matter of the dispersion):

70-90 parts by weight of acrylate polymer,
5-15 parts by weight of aggregate particles, and
0.1-5 parts by weight of coagulator or coagulators.

In addition, the dispersion comprises liquid as the dispersion medium, such as water, the amount of which is determined according to the dry matter content.

The polymer dispersion according to the present invention is very durable. Typically, its storage time is at least 10 hours, in particular at least 24 hours, most suitably at least 7 days, preferably at least 30 days, for example 1.5-24 months.

Forming the Coating

If the polymer dispersion mixture is applied by high pressure spraying, the method preferably comprises at least the following steps:

a) forming, in particular, a water-based polymer dispersion mixture of at least two polymer dispersion having different particle sizes,
b) adding a solid matter mixture to the polymer dispersion mixture formed in step a), which mixture comprises one or more iron or aluminium compounds or a mixture thereof, and coagulating agent or agents,
c) homogenising the polymer dispersion by stirring, in order to achieve the coating liquid, and
d) applying the coating liquid generated in step b) onto the substrate.

The product can be applied onto a solid substrate, as well as a textile or a mesh, by high pressure spraying.

The forming of a coating by high pressure spraying offers many benefits. Spraying renders it is easy to treat large surface areas relatively quickly. Also, treating vertical or downwardly oriented surfaces is relatively easy.

Typically, when the coating liquid is sprayed it is brought to a pressure of 100-600 bar, preferably 200-500 bar.

According to one embodiment of the present invention, the dispersion is applied to a solid substrate, as well as a textile or a mesh, by brushing. This embodiment preferably comprises at least the following steps:

a) forming an aqueous polymer dispersion mixture of at least two polymer dispersions having different particle sizes,
b) adding a solid matter mixture to the polymer dispersion mixture formed in step a), which mixture comprises one or more iron or aluminium compounds or a mixture thereof, and one or more coagulating (precipitating) agent, and
(c) applying by brushing the coating liquid provided in step b) to the surface to be coated.

This application method is particularly suited for treating and coating smaller surface areas.

The polymer dispersions of the examples described below are anionically dispersed, but they may also be cationically dispersed, in which case the neutralisation takes place by means of a base, respectively.

During or after the applying, the dispersed polymer is solidified from the dispersion in order to form the coating by film formation. The coagulator which is used for crosslinking of the dispersion polymer typically generates a controlled film formation of the dispersion. In this case, the film formation takes place, for example, when the water exits or, especially in the case of high-pressure spraying, under pressure.

The coating generated by the method according to the present invention is elastic, extensible and flexible and does not peel off or crack. The coating retains its elasticity even at low temperatures.

The coating generated by the method according the present invention is also suitable, in different ways, for joining materials, the heat expansion of which are different. With the coating it is possible to join, for example, metal and wood.

The thickness of the coating is generally approximately 0.1-50 mm, especially approximately 0.5-25 mm.

EXAMPLES

Example 1

Four compositions were prepared by using the method described above.

In the method, to start with, a first alkaline acrylate copolymer dispersion having a polymer particle size of approximately 500 nm and a dry matter content of approximately 60% by weight (dispersion I) was mixed with a second alkaline acrylic copolymer dispersion having a polymer particle size of approximately 100 nm and a dry matter content of approximately 40% by weight (dispersion II).

After that, finely divided iron (II)-bearing iron oxide and aluminium oxide were gradually added while briskly stirring. Finally, hydrophilic fumed silica and hydrophobic fumed silica were added in the form of a powder and, if necessary, also the amount of water needed to achieve the desired level of dry matter, after which the dispersion thus obtained was homogenised.

Tables 1-4 show the percentages of the substances of four different compositions. In the examples, mixed dispersions of acrylate are used, which correspond to the abovementioned dispersions I and II, hydrophobic silicon dioxide having an average particle size of approximately 20 nm, hydrophilic silicon dioxide having an average particle size of approximately 10 nm and iron (II, III) oxide having an average particle size of approximately 200 nm and aluminium hydroxide, having an average particle size of approximately 1.7 μm.

TABLE 1

| | |
|---|---|
| Polymer 1 | 64.4% |
| Polymer 2 | 23.9% |
| Iron oxide | 10.6% |
| Hydrophobic silicon dioxide | 1.1% |
| Dry matter content | 60.8% |

TABLE 2

| | |
|---|---|
| Polymer 1 | 62.8% |
| Polymer 2 | 15.5% |
| Iron oxide | 19.2% |
| Hydrophobic silicon dioxide | 2.5% |
| Dry matter content | 66.2% |

TABLE 3

| | |
|---|---|
| Polymer 1 | 70.9% |
| Polymer 2 | 15.6% |
| Iron oxide | 11.2% |
| Aluminium hydroxide | 0.4% |
| Hydrophobic silicon dioxide | 0.5% |
| Hydrophilic silicon dioxide | 1.4% |
| Dry matter content | 62.9% |

TABLE 4

| | |
|---|---|
| Polymer 1 | 67.8% |
| Polymer 2 | 17.0% |
| Iron oxide | 10.2% |
| Aluminum hydroxide | 2.1% |
| Hydrophobic silicon dioxide | 0.5% |
| Hydrophilic silicon dioxide | 2.5% |
| Dry matter content | 62.8% |

Example 2

Compositions 3 and 4 according to Example 1 were brushed onto 13 mm thick gypsum boards, the size of which was 500 mm×600 mm, and, correspondingly, onto concrete slabs, the size of which was 300 mm×300 mm. The surface of the concrete slabs used in the tests had been sand blasted.

Corresponding applications were carried out by spraying.

From the samples were determined the properties, the determining methods, the measurement results; "Märkätilojen vedeneristeiden ja pintajärjestelmien sertifiointiperusteet VTT SERT R003" ("Certification criteria for wet room waterproofing and surface systems VTT SERT R003").

From the measurement results it was possible to conclude that the product is waterproof and thus acts as a waterproofing agent.

The water vapor resistance Z of the product applied by hand was 5.8×109 ($m^2$ s Pa/kg) having an average layer thickness of 0.6 mm, and of a mechanically sprayed 5.3×109 ($m^2$ s Pa/kg) having a layer thickness of 0.3 mm.

The crosslinking of the cracks of the composition applied by hand onto the concrete was measured at room temperature to be 10.3 mm.

It was possible to affect the elasticity, hardness and strength properties of the generated coating by changes in the number of polymers, the ratio between the various polymers, the composition of the aggregate, and the number of coagulators.

INDUSTRIAL APPLICABILITY

The coating method according to the present invention is excellently suited for surfaces positioned in all planes, due to its good adhesion and rapid solidification. Thus, the present method can be used to coat both horizontal and vertical structures, even inner surfaces of roofs.

The present polymer-solid matter combination has very interesting properties. Thus, a film and coating can be formed which have good breathability and water vapour permeability. Due to the good adhesion of the coating or film, it is also possible to make it adhere to damp or even wet surfaces. The coating or film also has good elasticity. Creep tests have shown that the material is a viscoelastic elastomer. Therefore, both a coating and a film adapts, for example, to the surface of an uneven substrate.

The coating generated by the method according to the present invention is well suited as to be a moisture barrier of structures, waterproofing and for repairing leakage of all types of structures. It can be used on various roofs, façades, balcony surfaces, asphalt surfaces; basins and tanks; footings and foundations; in bathrooms, saunas and other humid rooms, both in industry and in construction, as well as in land, road and bridge construction. The roofs to be coated can have for example, felt, tin or cement coated fibreboard surfaces. The present method is also suitable for coating or making porous materials more dense.

The present method is also suitable for coating or compacting mesh-like and fabric-like materials. For example, lightweight blocks (Leca®), gypsum boards (Gyproc®), fibre boards, mineral wool, such as glass or stone wool, filter fabrics or gauzes can preferably be coated and rendered waterproof by the method of the present invention. In this way, it is possible to use these materials in locations subject to humidity where it has previously been impossible or disadvantageous due to the water absorbency and porosity of the materials.

The present invention is not intended to be limited only to the embodiments shown exemplified above but, on the contrary, is intended to be broadly interpreted within the scope of protection determined by the claims described below.

The following embodiments represent preferred solutions:
1. An elastic coating based on a water-based polymer dispersion, which coating is a reinforced molecular cross-linked structure comprised of
a) a polymer dispersion having a multimodal particle size distribution,
b) dispersed metal compounds, and
c) additives such as aluminum hydroxide or silicon dioxide.
2. A coating according to Embodiment 1, in which the dispersion forms a film that is based on a reinforced cross-linked structure, and which is based on the chemical interactions between the components a), b) and c) of Embodiment 1 and the cross-linked structure thus generated.
3. A method for generating an elastic coating which is suitable for waterproofing, from a polymer dispersion by using film formation, onto a solid, mesh-like or porous substrate, in which case a dispersion that comprises
　i) one or more aggregates that are at least substantially in solid form,
　ii) one or more polymers,
　iii) one or more surface active agents, and
　iv) one or more coagulators,
is brought into contact with the dispersion coagulator no earlier than when the coating is carried out, to form a polymer film on the substrate.
4. A polymer dispersion comprising at least one polymer, which is an acrylate polymer, most suitably the dispersion comprises at least two acrylate polymers or copolymers, which consist of at least two different types of acrylate monomer.
5. A polymer dispersion according to Embodiment 4, which comprises per 100 parts by weight of dispersed substance:

70-90 parts by weight of an acrylate polymer, in particular a mixture of two acrylate polymers,
5-15 parts by weight of solid matter particles, such as iron oxide, aluminium oxide or a mixture thereof, and
0.1-5 parts by weight of a coagulator such as silicon dioxide, hydrophobic silicon dioxide or a mixture thereof.
6. A method for preparing a polymer dispersion, in which method
a mixture of polymer dispersions comprising a first and a second polymer is prepared, in which case the first polymer comprises an acrylate polymer, in particular an acrylate copolymer having a polymer particle size of approximately 500±50 nm, and the second polymer comprises an acrylate polymer, in particular an acrylate copolymer having a polymer particle size of approximately 100±10 nm, and
to the mixture thus generated is added, while mixing, iron or aluminium compound or a mixture thereof, and silicon dioxide or hydrophobic silicon dioxide or a mixture thereof.

REFERENCE PUBLICATIONS

Patent Literature

CA 2205668
US 2013131228
CN 103525307
CN 102965018
CN 103555203
DE 2027606
EP 0 794 018
EP 1 544 268

The invention claimed is:

1. A method of producing an elastic coating which is suitable for waterproofing, by using film-forming, onto a solid, mesh-like or porous substrate, wherein in order to coat the substrate, a dispersion that comprises, dispersed in a liquid phase,
　i) one or more aggregates, which are at least mainly in solid form,
　ii) one or more polymers,
　iii) one or more surface-active agents, and
　iv) one or more coagulators,
is applied onto a substrate, and the elastic coating is formed from the dispersion, no earlier than during the application, by removing at least a portion of the liquid phase from the dispersion,
　wherein the dispersion comprises, mixed with each other, a first polymer which has a first particle size, and a second polymer which has a second particle size, the ratio between the first and the second particle size being 2:1-25:1.

2. The method according to claim 1, wherein the one or more coagulators comprise a hydrophobic component, and wherein crosslinking of the dispersion is prevented until the dispersion is brought to such a pressure that the hydrophobic component can no longer prevent the crosslinking.

3. The method according to claim 1, wherein the dispersion is brought, when spraying, to a pressure which is 100-600 bar.

4. The method according to claim 1, wherein crosslinking of the dispersion is prevented by using a hydrophobic component contained in the dispersion, until at least a portion of the liquid phase of the dispersion is evaporated or otherwise reduced during application to such an extent that the hydrophobic component no longer can prevent the crosslinking.

5. The method according to claim 1, wherein the dispersion is cross-linked via the one or more coagulators.

6. The method according to claim 5, wherein the one or more coagulators comprise hydrophobic silicon dioxide.

7. The method according to claim 1, wherein the one or more aggregates, which are contained in the dispersion, comprise an iron and/or an aluminium compound or compounds.

8. The method according to claim 7, wherein a weight ratio of the aluminium and iron compound or compounds, which are contained in the dispersion, is in a range of 1:50-1:2.

9. The method according to claim 1, wherein the dispersion is coated onto the surface, textile or mesh, by brushing, in which case, according to the present method:
   a) an aqueous polymer dispersion is formed from at least two polymer dispersions which have different particle sizes therein,
   b) into the aqueous polymer dispersion formed in step a) is added a solid matter mixture, which comprises an iron and/or an aluminium compound or compounds, and a coagulator,
   c) the polymer dispersion thus generated is homogenised by stirring, and
   d) the dispersion is applied onto the surface to be coated by brushing.

10. The method according to claim 1, wherein a dry matter content of the dispersion is at least 55% by weight, calculated from the weight of the dispersion.

11. The method according to claim 1, wherein the dispersion is applied by:
   a) forming a water-based polymer dispersion of at least two polymer dispersions having different particle sizes,
   b) adding into the polymer dispersion mixture formed in step a) a solid matter mixture, which comprises an iron and/or aluminium compound or compounds, and a coagulator, and
   c) applying the coating liquid provided in step b) onto the surface, textile or mesh to be coated by spraying.

12. The method according to claim 11, wherein a dry matter content of the dispersion is from 50-75% by weight, calculated from the weight of the dispersion.

13. The method according to claim 1, wherein precipitation is carried out using a material which comprises finely divided silicon dioxide.

14. The method according to claim 1, wherein organic solvents are not used in the method.

15. An elastic coating prepared by the method according to claim 1.

16. The method of claim 1, wherein the dispersion comprises, based on 100 parts per weight of a dry matter of the dispersion:
   70-90 parts by weight of an acrylate polymer;
   5-15 parts by weight of inorganic particles different from the one or more coagulators; and
   0.1-5 parts by weight of the one or more coagulators.

17. A method of forming a waterproof elastic coating on a substrate, the method comprising:
   providing a film-forming polymer dispersion comprising, dispersed within an aqueous phase, at least:
      an acrylate polymer comprising first acrylate polymer particles having a first average size and second acrylate polymer particles having a second average size smaller than the first average size;
      a plurality of inorganic particles for filling a volume between the first and second acrylate polymer particles; and
      at least one coagulator for promoting film formation of the dispersion;
   applying the dispersion to the substrate: and removing at least a portion of a liquid phase from the dispersion to form the waterproof elastic coating on the substrate.

18. The method of claim 17, wherein cross-linking amongst the first and second acrylate polymer particles is prevented until the removing of at least a portion of the liquid phase is done to such an extent that cross-linking is no longer prevented.

* * * * *